United States Patent
Franklin et al.

(10) Patent No.: US 7,219,353 B2
(45) Date of Patent: May 15, 2007

(54) FINITE STATE MACHINE WITH A SINGLE PROCESS CONTEXT FOR A RAID SYSTEM

(75) Inventors: Chris R. Franklin, Merrimack, NH (US); Randy M. Arnott, Mont Vernon, NH (US); Jeffrey T. Wong, Newton, MA (US); Eric S. Noya, Groton, MA (US)

(73) Assignee: Broadcom Corporation, Irvine, CA (US)

( * ) Notice: Subject to any disclaimer, the term of this patent is extended or adjusted under 35 U.S.C. 154(b) by 1051 days.

(21) Appl. No.: 09/794,879

(22) Filed: Feb. 27, 2001

(65) Prior Publication Data

US 2002/0120789 A1    Aug. 29, 2002

(51) Int. Cl.
*G06F 13/00* (2006.01)

(52) U.S. Cl. ..................... 719/325; 711/114
(58) Field of Classification Search ............... 709/325, 709/328; 711/114, 102, 100; 326/46; 713/1, 713/2; 714/6; 369/47.14; 719/310, 325–327
See application file for complete search history.

(56) References Cited

U.S. PATENT DOCUMENTS

| | | | |
|---|---|---|---|
| 5,081,577 A | | 1/1992 | Hatle .......................... 364/200 |
| 5,088,081 A | * | 2/1992 | Farr ........................ 369/47.14 |
| 5,271,012 A | * | 12/1993 | Blaum et al. .................. 714/6 |
| 5,301,297 A | * | 4/1994 | Menon et al. ............... 711/114 |
| 5,392,244 A | * | 2/1995 | Jacobson et al. ........... 711/114 |
| 5,524,204 A | | 6/1996 | Verdoorn, Jr. ............... 395/182 |
| 5,574,851 A | | 11/1996 | Rathude ...................... 395/182 |
| 5,574,882 A | * | 11/1996 | Menon et al. ............... 711/114 |
| 5,598,549 A | * | 1/1997 | Rathunde ..................... 711/114 |
| 5,644,767 A | * | 7/1997 | Rathunde ........................ 713/1 |
| 5,721,920 A | | 2/1998 | Mak et al. ................... 395/672 |
| 5,758,118 A | | 5/1998 | Choy et al. .................. 395/441 |
| 5,920,884 A | * | 7/1999 | Jennings et al. ............ 711/102 |
| 6,021,462 A | * | 2/2000 | Minow et al. .............. 711/114 |
| 6,058,454 A | * | 5/2000 | Gerlach et al. ............. 711/114 |
| 6,138,125 A | * | 10/2000 | DeMoss ...................... 707/202 |
| 6,493,804 B1 | * | 12/2002 | Soltis et al. ................. 711/152 |
| 6,651,165 B1 | * | 11/2003 | Johnson .......................... 713/2 |

OTHER PUBLICATIONS

Long et al. "Swift/RAID: A Distributed RAID System" pp. 1-20, IEEE 1994.*

* cited by examiner

*Primary Examiner*—Van H. Nguyen
(74) *Attorney, Agent, or Firm*—Sterne, Kessler, Goldstein & Fox, PLLC

(57) ABSTRACT

A finite state machine (FSM) for a redundant array of independent disk includes a single process context that maintains an entire finite state required for input/output operations performed in a RAID system. The finite state is only updated in response to calls and call-backs. The call-backs can include procedure returns and interrupt signals. The call is received directly from an application program, and the call-backs are received from a driver and passed back directly to the application software by the finite state machine.

24 Claims, 5 Drawing Sheets

FINITE STATE MACHINE WITH A SINGLE PROCESS CONTEXT FOR A RAID SYSTEM

FIELD OF THE INVENTION

This invention relates generally to the field of disk storage systems, and more particularly to redundant arrays of independent disks.

BACKGROUND OF THE INVENTION

Most modern, mid-range to high-end disk storage systems are arranged as redundant arrays of independent disks (RAID). A number of RAID levels are known. RAID-1 includes sets of N data disks and N mirror disks for storing copies of the data disks. RAID-3 includes sets of N data disks and one parity disk. RAID-4 also includes sets of N+1 disks, however, data transfers are performed in multi-block operations. RAID-5 distributes parity data across all disks in each set of N+1 disks. At any level, it desired to have RAID systems where an input/output (I/O) operation can be performed with minimal operating system intervention.

In most modem RAID systems, application software issues a procedure call to a state driven I/O driver of the operating system to perform the I/O operations. The I/O driver then passes the call to the RAID system. Successful or unsuccessful completion of the I/O operation is signaled from the RAID system to the I/O driver, and then to the application via call-backs, e.g., procedure returns and interrupt signals.

Often, the RAID system is used as the core for a file server, or a large database. There, the RAID system must be able to interact with a number of different types of hardware platforms, e.g., end-user PCs and work stations, and compute, print, and network servers, and the like. Consequently, it is a major problem to ensure that the RAID system will work concurrently and reliably with a variety of different operating systems, e.g., UNIX, LINUX, NT, WINDOWS, etc. Key among those problems is to determine how to give the RAID system a process context in which to perform multi-block operations, such as generating parity in a RAID-5 set, or copying data in a RAID-1 set when thousands of blocks need to be processed with a single I/O operation. On-line expansion and RAID level migration also require a process context.

Because process contexts can have different states and different state transitions in different operating systems, it is difficult to make a generic RAID system operate reliably. Also, prior art RAID systems require that there be some process context in the operating system to perform a multi-block operation in the RAID system.

Therefore, it is desired to provide a RAID system that can operate with any operating system, or no operating system at all.

SUMMARY OF THE INVENTION

A primary objective of the present invention is to provide a RAID system, which is, in its entirety, state driven, and, therefore, has no dependencies on operating system process contexts.

A related object of the invention is to provide a RAID system, which can be used without an operating system to enhance the performance of a RAID system by eliminating the overhead of operating system process contexts.

In accordance with the invention, only input/output (I/O) calls and call-backs drive a RAID finite state machine (FSM). The entire process state required to perform the I/O operations in the RAID system are maintained within the RAID FSM, and the I/O calls and call-backs are the only stimuli that change the state of the RAID FSM.

The RAID FSM according to the invention can be used with any operating system, any input/output driver, or no external process context at all. The RAID FSM according to the invention uses a small number of I/O calls and call-backs, and a small number of well-defined states and state transitions maintained entirely within the RAID FSM.

More particularly, the invention provides a finite state machine (FSM) for a redundant array of independent disk. The RAID FSM includes a single process context that maintains an entire finite state required for input/output operations performed in the RAID system. The finite state is only updated in response to procedure calls and call-backs. The call-backs can be procedure returns and interrupt signals. The procedure call can be received directly from application software, or an application interface. The call-backs are received from a driver and passed back directly to the application software by the finite state machine. The single process context is external to an operating system, and the input/output operation can specify a large, multi-block operation.

DETAILED DESCRIPTION OF THE PREFERRED EMBODIMENTS

System Structure

Figure 1:
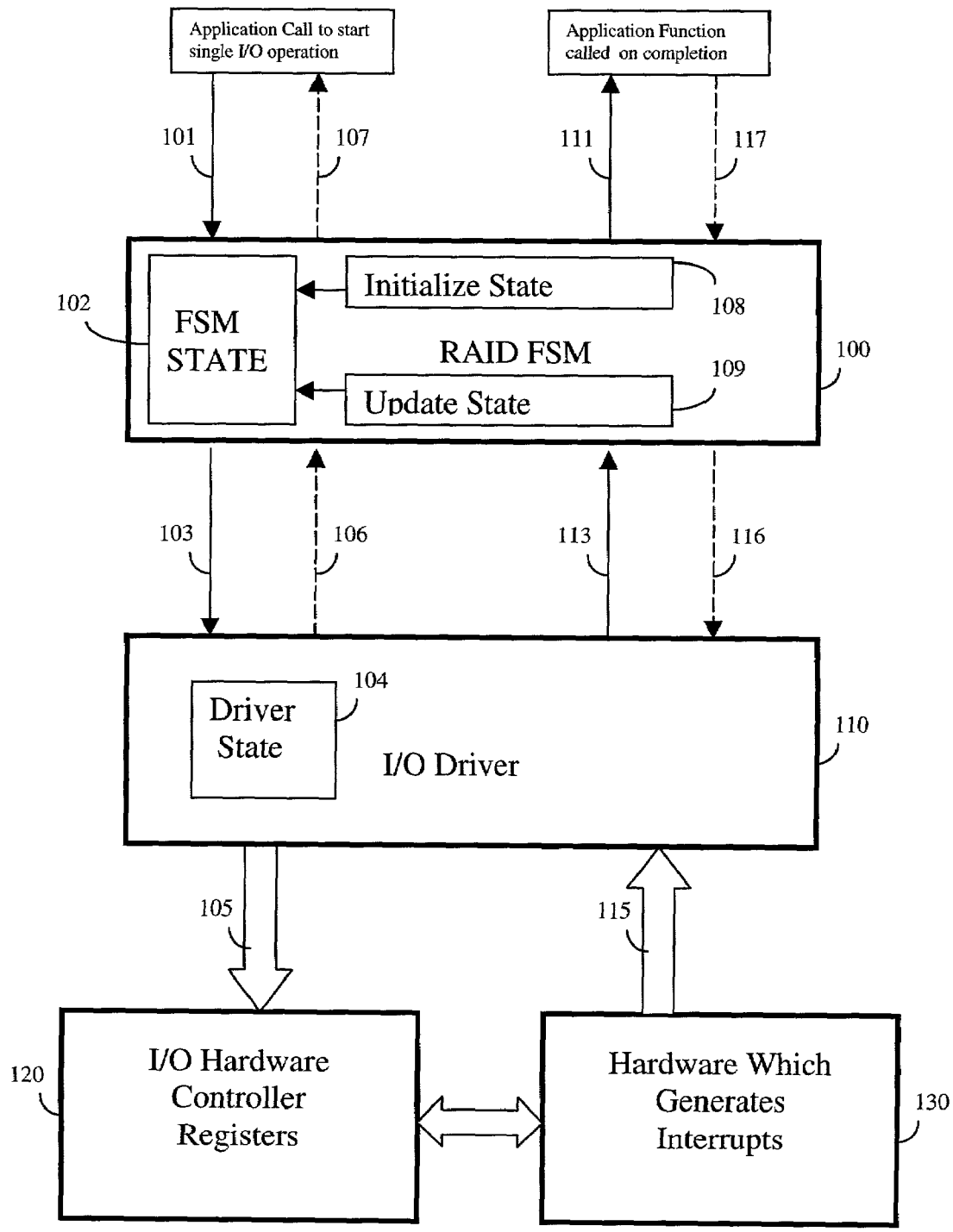
FIG. 1 is a block diagram of RAID system using a RAID finite state machine according to the invention.

FIG. 1 show the structure of a disk storage system including a RAID finite state machine (FSM) 100 according to the invention. The RAID FSM can be used with any redundant arrays of independent disks, and any operating system. The RAID FSM 100 includes a single process context for maintaining an entire finite state 102 for input/output operations performed in the redundant array of independent disks, means 108 for initializing the finite state, and means 109 for updating the finite state. The single process context is only responsive to procedure calls and call-backs. The entire finite state is maintained in memory cells or registers of the single process context. Specific states and state transitions are described in greater detail below.

The procedure calls can be issued, for example, by application software, and call-backs are due to interrupt signals generated by the redundant arrays of independent disks. In the preferred embodiment, the FSM 100 is implemented with software procedures, although it should be understood that the RAID FSM 100 can also be implemented with a hardware controller, firmware.

As an advantage of the present invention, the entire necessary state related to processing input/output operations in the RAID system is maintained by the FSM 100, and not by any operating system process contexts. As additional advantage, the RAID FSM 100 according to the invention can be used concurrently with any number of computer systems, perhaps executing different operating systems, or none at all The system also includes an I/O driver 110 and I/O hardware registers 120. The driver 110 and registers 120 are coupled to a RAID 130. The structure and operation of these components are well know.

System Operation

During operation, an application (hardware or software) can directly request the RAID FSM 100 to perform an I/O operation via an I/O call 101. In the case that the application is implemented in software, the call can be a procedure or function call. In the case that the application is implemented in hardware, as described below, the call can be in the form of electronic signals, for example, values in controller or bus registers.

A small number of calls can be defined, for example, initialize, write, read, or copy N blocks beginning at block X. To distinguish these calls from traditional driver calls, these can be called FSM calls.

In response to the call 101, the RAID FSM 100 initializes 108 the state 102 related to processing the I/O call 101. The RAID FSM then issues a driver call 103 to the I/O driver 110. The I/O driver can maintain driver state 104 related to the driver call 103. Some drivers, as described below, cannot maintain state. This does not matter. The I/O driver 110 then writes I/O data 105 into the hardware registers 120 to begin the requested operation in the RAID 130. After the driver 110 has written the registers 120, the driver calls back 106 the RAID FSM 100 so that the RAID FSM state 102 can be updated. The RAID FSM 100 then calls back 107 the application that the requested operation has begun, and the application can resume execution.

At this time, both the RAID FSM 100 and the I/O driver 110 are temporarily finished. Indeed, no code needs to execute in either the RAID FSM 100 or the I/O driver 110 while the RAID 130 performs the request I/O operation 101. Furthermore, no code needs to execute in the operating system, now or later, to manage the I/O operation and its completion.

After the requested I/O operation completes in the RAID 130, successful or not, an interrupt (call-back) 115 signals the driver 110, perhaps causing a completion procedure to be executed in the driver. The call-back can include status information, such as, performance data, the reason for failure, e.g., corrupted data, time-out, etc. The completion procedure can update the driver state 104, and in turn call-back 106 the RAID FSM 100. The RAID FSM updates its state 102, and signals 111 completion of the requested operation 101 to the application in another call-back. The application now knows that the requested operation in the I/O call 101 has been completed, and acknowledges the RAID FSM of this fact in signal 117. The RAID FSM can discard the state 102 related to processing the I/O call 101, another form of state update. For completeness, the RAID FSM can, in turn, signal 116 the driver 110 to do the same. Note, that the signals shown as dotted lines will not be further described, although they can be assumed to be used in the description below.

It should be noted that the RAID FSM 100 according to the invention is arranged between the application software and the I/O driver, whereas in traditional RAID systems the application usually communicates first with the I/O driver, and then the I/O driver communicates with the RAID driver.

It should also be noted, that the RAID FSM can maintain multiple finite states, one for each I/O operation that is concurrently in progress.

Although the above described structure and operation might seem straightforward, this is not the case when the I/O request is for a multi-block operation, especially when it desired to do so with a single process context entirely within the RAID FSM, i.e., external to any operating system context, so that the RAID 130 can operate with different operating systems, or none at all. In the prior art, state for large, multi-block I/O operations are usually maintained in a process context of the operating system.

Multi-Block Operation

Figure 2:
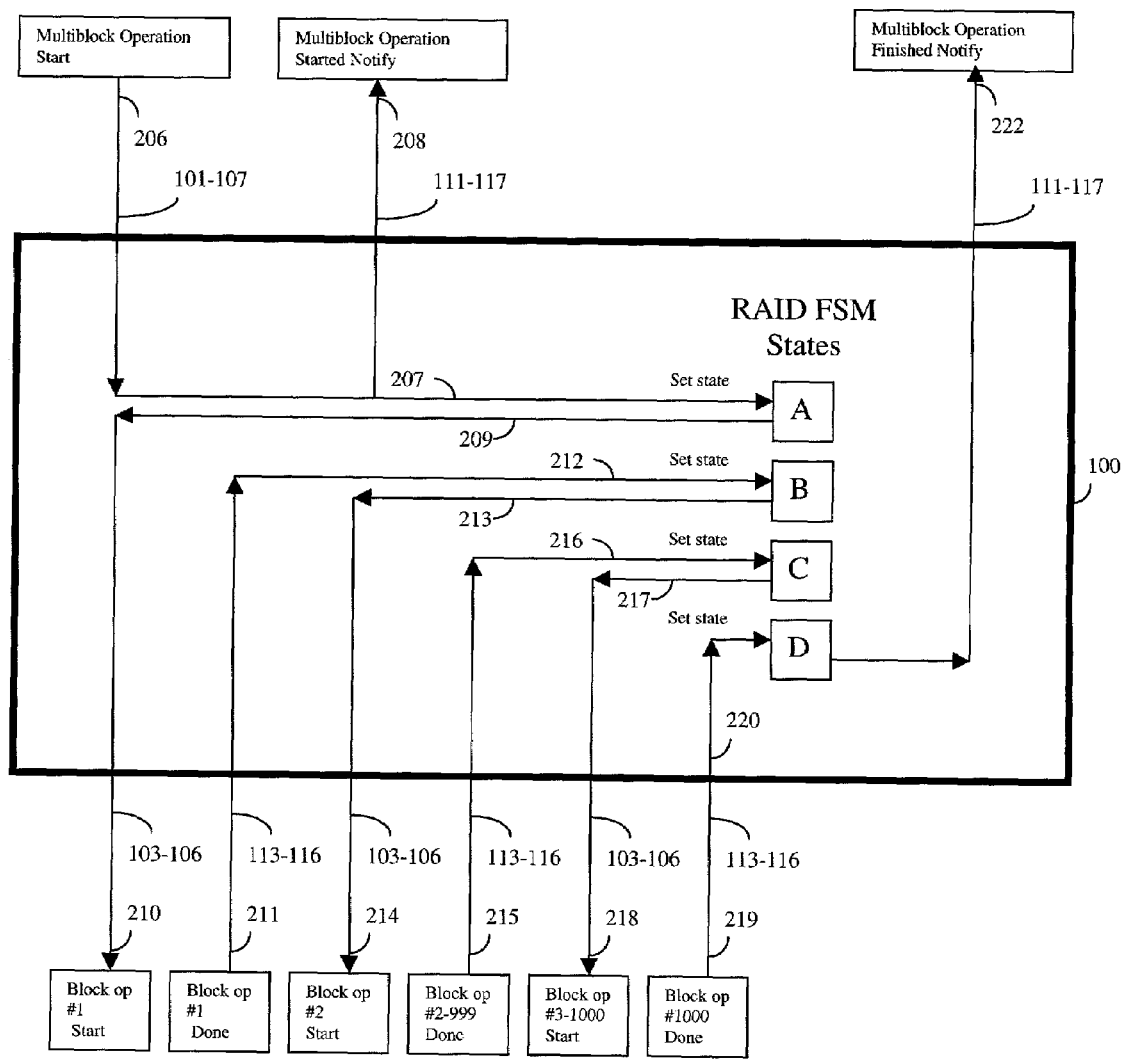
FIG. 2 is a block diagram of the RAID finite state machine according to the invention.

FIG. 2 shows how multi-block I/O operation, e.g., three, ten, hundreds, or even thousands, are performed with a single process context entirely within the RAID FSM according to the invention. An application requests the multi-block operation in an I/O call 206 using the interface 101–107, as shown in FIG. 1. This call causes the RAID FSM to initialize 207 state A, and to acknowledge (call-back) 208 to the application that the multi-block operation has begun using the interface 111–117 of FIG. 1. The application can now continue execution.

From state A, the RAID FSM 100 issues a driver call 209 using the interface 103–106 to the I/O driver to start the operation for the first block 210 of the requested multi-block operation 206. When this operation completes, the driver signals 211 the RAID FSM 100 using the interface 113–116. This signal causes the RAID FSM to transition 212 to state B. State B, triggers 213 the operation for the next block 214 using the interface 103–106. When that operation is complete, the driver signals 215 the RAID FSM 100 using the interface 113–116, and the RAID FSM transitions 216 to state C. From this point forward, the RAID FSM remains in state C while issuing 217 driver calls for all remaining blocks 218 using the interface 103–106. However, when the driver signals 219 completion of operation on the last block 119 using the interface 113–116, the RAID FSM 100 transitions 220 to state D. State D causes the RAID FSM 100 to acknowledged 222 to the application, via a call-back, using the interface 111–117, that the entire multi-block operation has completed.

Mini-Port Driver Operation

In most operating systems, the I/O driver is used to translate the software I/O calls from the application to the RAID hardware registers. A commonly used driver with minimum functionality is called a "mini-port" driver (MPD). As a characteristic, a mini-port driver executing under a host computer operating system, such as Windows NT or Windows 95, is limited in how it can operate. For example, the mini-driver, by design, has no access to processes or threads. That is, it can be called a context-less driver. It is called in only one context, and it is expected to initialize the hardware and return as quickly as possible. Traditional RAID systems cannot operate solely within this limitation, particularly while performing multi-block operations. Therefore, prior art RAID systems must also use an operating system process or thread. A RAID system that uses the RAID FSM 100 according to the invention has no such requirements.

Figure 3:
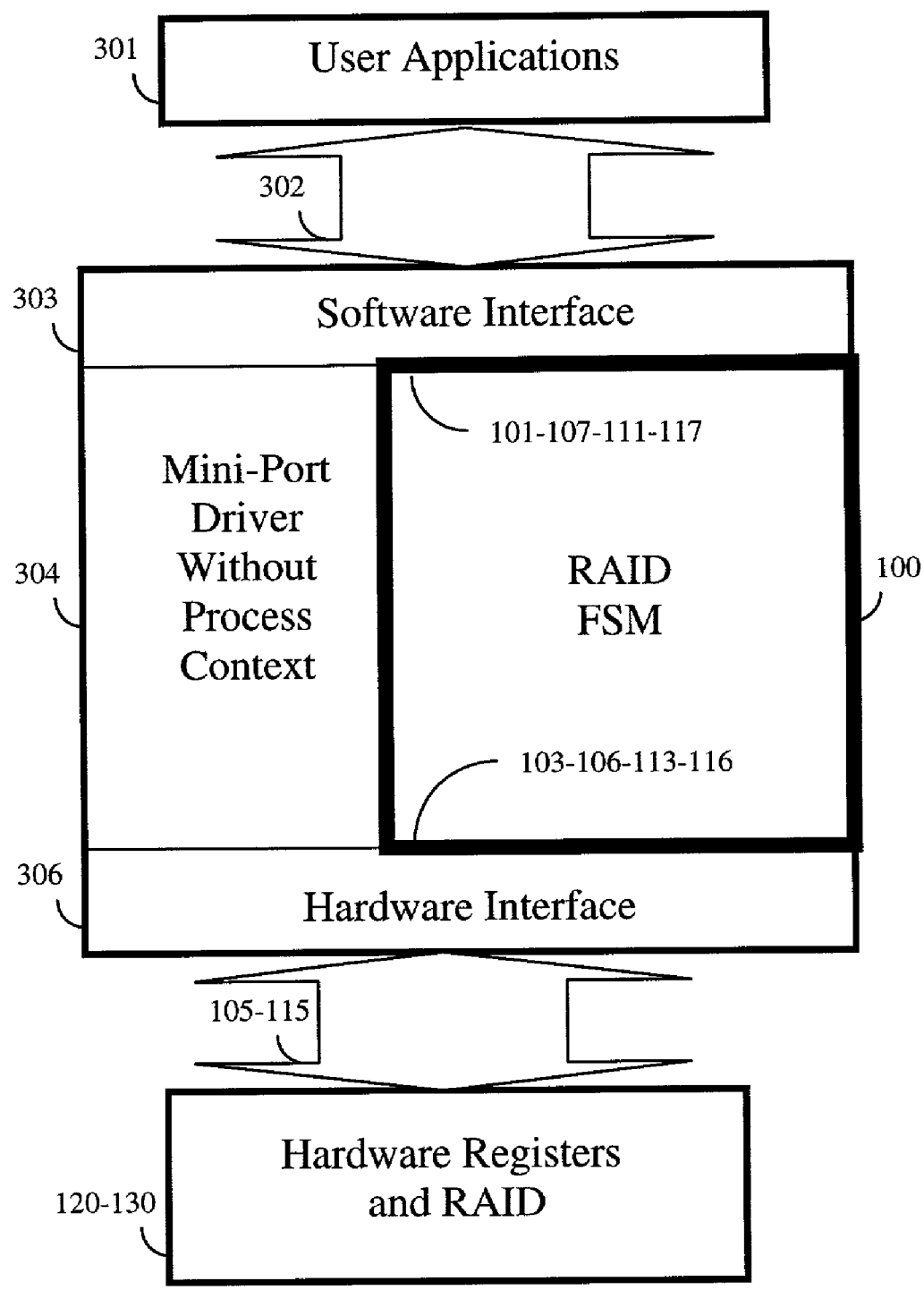
FIG. 3 is a block diagram of a RAID system with a mini-port driver according to the invention.

As shown in FIG. 3, the RAID FSM 100 can be used directly with a mini-port driver, and without maintaining operating system process context. In this embodiment of the invention, a mini-port driver 304 includes a software interface 303, a hardware interface 306, and the RAID FSM 100 according to the invention.

During operation of the system, a user application 301 issue an I/O call to the operating system 302. The operating system 302 translates the I/O call into a driver call, and calls the software interface 303. The software interface 303 translates the driver call into the call format 101–107–111–117 used by the RAID FSM 100, i.e., RAID FSM calls as described above. The RAID FSM 100 initializes the finite state, and in turn calls the mini-driver 304 via the hardware interface 306, using the interface 103–106–113–116, and the mini-driver interacts 105–115 with the hardware, i.e., the registers 120 and RAID 130 of FIG. 1 as described above.

Because the RAID FSM 100 according to the invention operates in a single process context, the driver calls and interrupts (call-backs) are sufficient to accomplish all of operations, including multi-block operations, such as writing to the entire RAID, on-line expansion, and on-line RAID level migration.

Large RAID Storage System Operation

Figure 4:
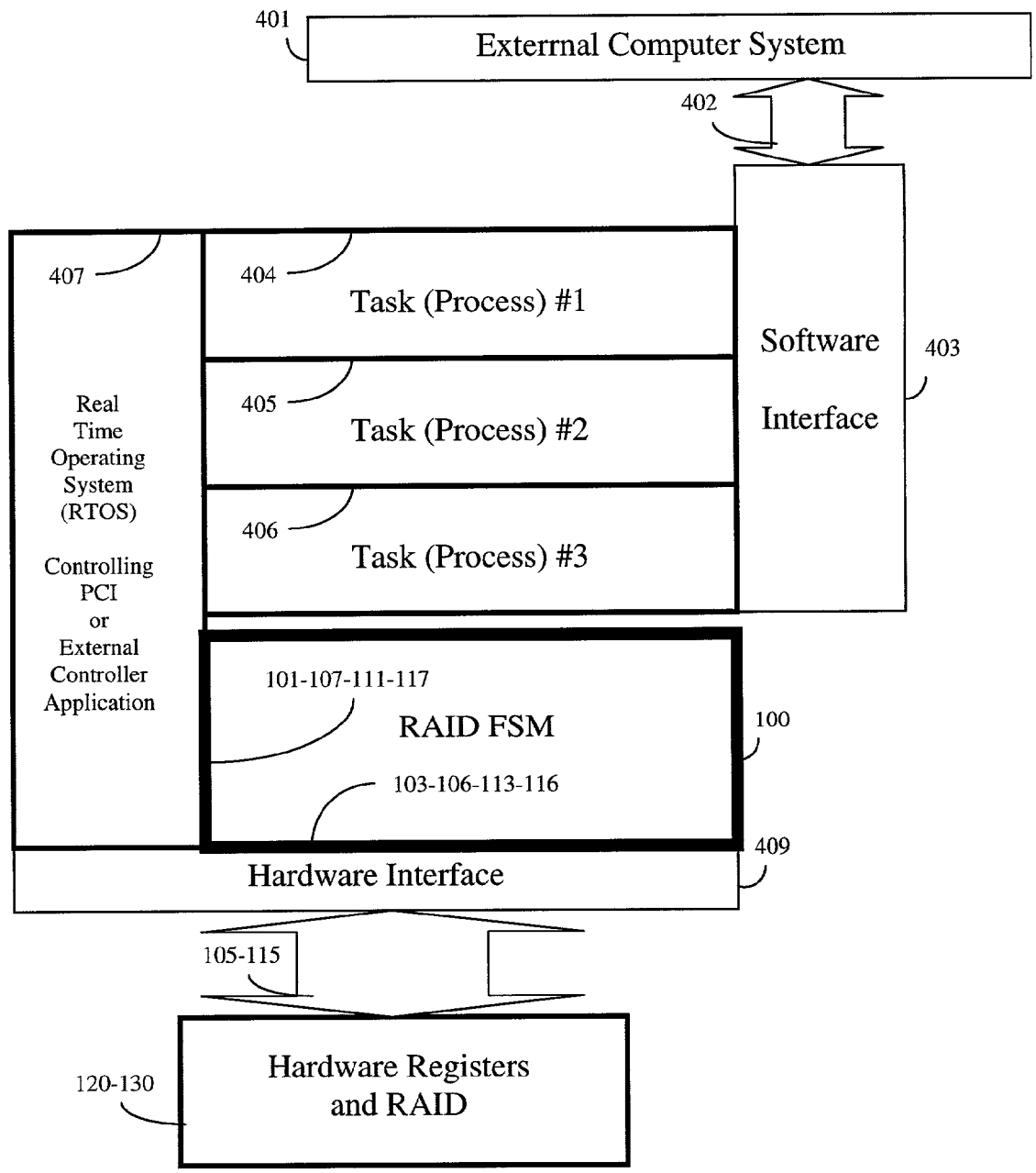
FIG. 4 is a block diagram of a large RAID system according to the invention.

FIG. 4 shows the use of the RAID FSM 100 according to the invention with a large RAID disk storage system. In this embodiment, the large RAID disk storage system can be connected to an external computer system 401 by a SCSI bus, a PCI bus, or a high-bandwidth network 402. In any case, the large storage system requires much more complex operations than those processed by the simpler disk storage systems described above. However, such large storage systems can be implemented with the single context RAID FSM according to the invention.

In this embodiment, the operating system or application software of the external system 401 calls a software interface 403 via the connection 402. The application may, or may not use multiple tasks 404–406 to manipulate data, e.g., interact with a large file system or database.

The tasks 404–406 can be controlled by a real-time operating system (RTOS) 407, and use calls specific for the RTOS. However, the RAID FSM 100 operates without using any RTOS context. Calls from the software interface 403 to the RAID FSM 100 are via the tasks and/or the RTOS using the interface 101–107–111–117. The RAID FSM 100 then calls the hardware interface 409 using the interface 103–106–113–116 which interacts 105–115 with the hardware, i.e., writes registers 120 and receives interrupts from the RAID 130, as described above. Translation of the calls and call-backs between the various components is done as described above.

Because the RAID FSM 100 only uses a finite state, the calls and call-backs are enough for all operations, including multi-block operations, such as writing to the entire RAID, on-line expansion, and on-line RAID level migration. No RTOS specific tasks are needed, nor are any RTOS specific functions. All RAID system operations are accomplished by using only I/O calls, and completion call-backs.

Operating a RAID System without an Operating System

Figure 5:
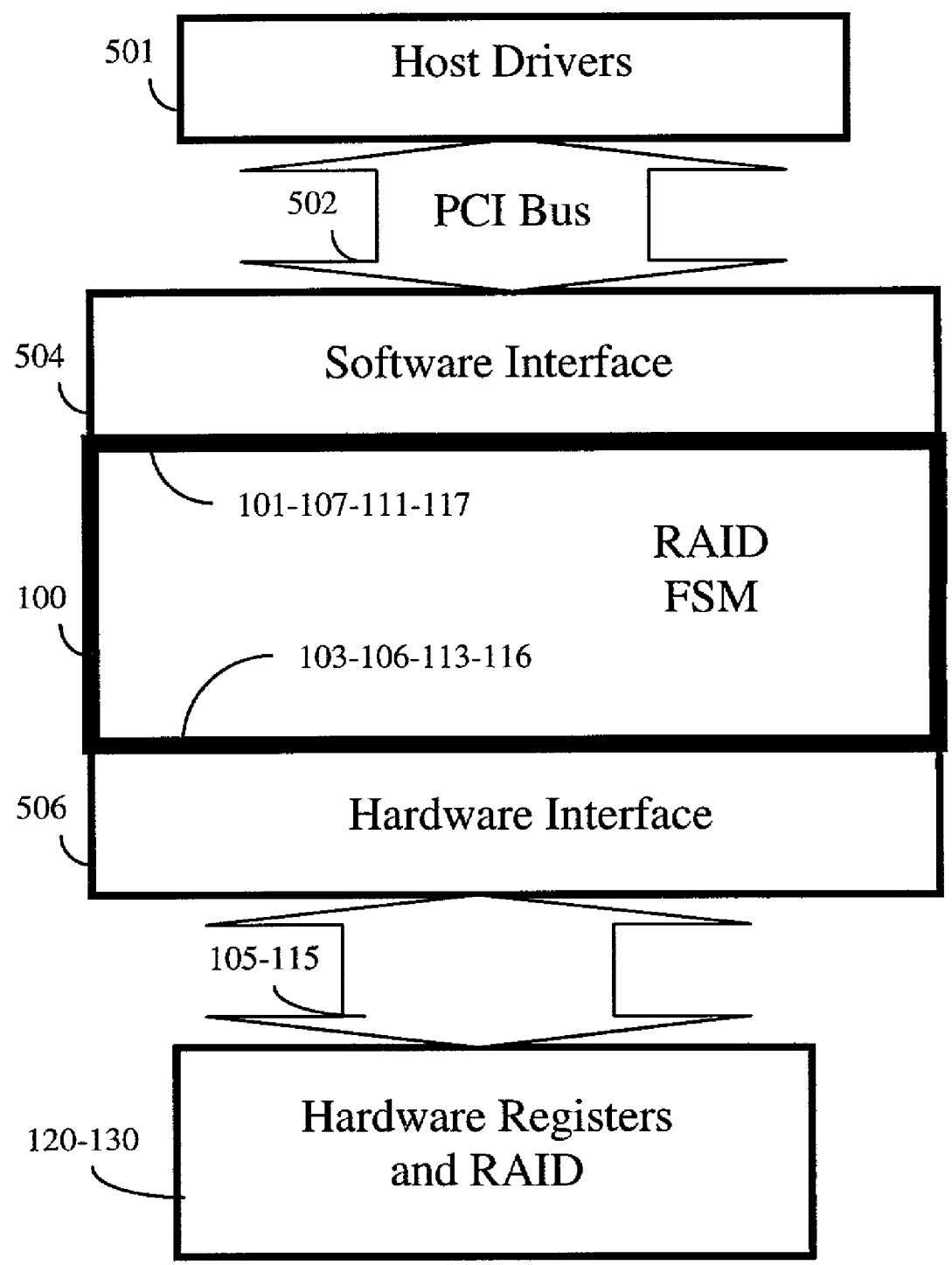
FIG. 5 is a block diagram of a RAID system with no supporting operating system.

FIG. 5 shows how the RAID FSM according to the invention can be used without an operating system, to decrease cost, system complexity, while improving performance. In the example implementation shown in FIG. 5, the application, e.g., host drivers 501, are connected to the RAID FSM 100 via a PCI bus 502, and a PCI software interface 504. The host drivers can be hardware process controllers operating without the aid of an operating system.

In this embodiment of the invention, the host drivers 501 write and read PCI bus registers to initiate an I/O operation, i.e., electronic signals. The software interface 504 translates the registers written by the host driver into calls that are compatible with the RAID FSM 100, using the interface 101–107, as described above. The RAID FSM then calls the hardware interface 506 using the interface 103–106, which in turn interacts 105–115 with the hardware 120–130 as described above.

When the I/O operation is complete, the hardware interface 506 receives an interrupt, and calls back the RAID FSM 100 using the interface 113–116, as described above. The RAID FSM 100 in turn causes a call-back to the PCI software interface 504, using the interface 111–117, which then interrupts (calls-back) the host driver 501 (application) through the PCI bus 502. This embodiment has the same advantages as described above. All RAID system operations are done with I/O calls and completion call-backs. Such a system can be used, for example, to automatically and reliably perform large-scale periodic data back-ups without operating system intervention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

We claim:

1. A finite state machine stored on a computer-readable medium for a redundant array of independent disks, the finite state machine comprising:
   a single process context configured to maintain a plurality of entire finite states required for an input/output operation performed in the redundant array of independent disks;
   means for initializing the finite states only in response to a call; and
   means for updating the finite states only in response to call-backs;
   wherein there is one entire finite state for each one of a plurality of concurrent I/O operations performed in the redundant array of independent disks.

2. The finite state machine of claim 1 wherein the single process context and the redundant array of independent disks operate independently of an operating system process context.

3. The finite state machine of claim 1 wherein the call-backs include procedure returns and interrupt signals.

4. The finite state machine of claim 1 wherein the single process context is external to an operating system process context.

5. The finite state machine of claim 1 where in the input/output operation specifies a multi-block operation.

6. The finite state machine of claim 5 wherein the multi-block operation includes more than two blocks.

7. The finite state machine of claim 1 further comprising:
   a bus connecting the finite state machine to an external computer system via a software interface configured to translate a driver call into the call for the finite state machine; and
   a hardware interface configured to translate the call into a driver call after the finite state is initialized.

8. The finite state machine of claim 1 further comprising:
   a bus connecting the finite state machine to a context-less driver via a software interface configured to translate a driver call into the call for the finite state machine; and
   a hardware interface configured to translate the call into a driver calls after the finite state is initialized.

9. A finite state machine stored on a computer-readable medium for a redundant array of independent disks, the finite state machine comprising:
- a single process context configured to maintain an entire finite state required for an input/output operation performed in the redundant array of independent disks;
- means for initializing the finite state only in response to a call; and
- means for updating the finite state only in response to call-backs,
- wherein the call is received by the finite state machine directly from application software, and the call-backs are received from a driver and passed back directly to the application software by the finite state machine.

10. The finite state machine of claim 9 wherein the driver is a context-less driver.

11. The finite state machine of claim 10 wherein the context-less driver further comprises:
- a software interface configured to translate a driver call into the call for the finite state machine; and
- a hardware interface configured to translate the call into a driver call after the finite state is initialized.

12. A finite state machine stored on a computer-readable medium for a redundant array of independent disks, the finite state machine comprising:
- a single process context configured to maintain an entire finite state required for a multi-block input/output operation including more than two blocks performed in the redundant array of independent disks;
- means for initializing the finite state only in response to a call; and
- means for updating the finite state only in response to call-backs,
- wherein the finite state machine enters a first state in response to receiving the call, enters a second state in response to a call-back indicating completion an operation on a first block, enters a third state while performing an operation on all but a last block, enters a third state when initiating an operation on the last block, and enters a fourth state upon completing the operation on the last block.

13. A computer-implemented method for operating a redundant array of independent disks, the method comprising:
- providing a finite state machine for the redundant array of independent disks;
- maintaining a plurality of entire finite states required for an input/output operation performed in the redundant array of independent disks in a single process context;
- initializing the finite states only in response to a call; and
- updating the finite states only in response to call-backs;
- wherein there is one entire finite state for each one of a plurality of concurrent I/O operations performed in the redundant array of independent disks.

14. The method of claim 13 wherein the call-backs include procedure returns and interrupt signals.

15. The method of claim 13 wherein the single process context is external to an operating system process context.

16. The method of claim 13 wherein the input/output operation specifies a multi-block operation.

17. A computer-implemented method for operating a redundant array of independent disks, the method comprising:
- providing a finite state machine for the redundant array of independent disks;
- maintaining an entire finite state required for an input/output operation performed in the redundant array of independent disks in a single process context;
- initializing the finite state only in response to a call; and
- updating the finite state only in response to call-backs, wherein the call is received by the finite state machine directly from application software, and the call-backs are received from a driver and passed back directly to the application software by the finite state machine.

18. The method of claim 17 wherein the driver is a context-less driver.

19. The method of claim 18 further comprising: translating, in a software interface, a driver call into the call; and translating, in a hardware interface, the call into a driver call after the finite state is initialized.

20. A computer-implemented method for operating a redundant array of independent disks (RAID) in response to input/output calls from an external application, the method comprising:
- providing an interface in the RAID that receives the input/output calls from the external application and transmits responses thereto;
- providing a RAID finite state process operating entirely within the RAID, connected to said interface, that controls a plurality of concurrent input/output operations performed in the RAID without reliance on an external operating system;
- operating the RAID finite state process based on calls and call-backs received from the external application through said interface; and
- maintaining a plurality of entire finite states in the RAID finite state process, there being one entire finite state for each one of the plurality of concurrent I/O operations performed in the redundant array of independent disks.

21. The method of claim 20, wherein the step of operating the RAID finite state process is performed in response to an input/output call transmitted by a mini-port driver.

22. The method of claim 20, wherein the step of providing an interface in the RAID includes designating a register where the external application places RAID instructions.

23. The method of claim 22, further including the steps of:
- placing a RAID instruction from the external application in said register;
- signaling said finite state process that an instruction is available;
- transmitting an acknowledgement signal to the external application; and
- transmitting status information to the external application as the finite state process attempts to perform the RAID instruction.

24. The method of claim 20, wherein the step of providing an interface in the RAID includes providing an interface to receive instructions directly from the external application software rather than an operating system driver.

* * * * *